No. 881,075. PATENTED MAR. 3, 1908.
J. HOSKING.
SAFETY CONNECTION FOR TAPS AND CHUCKS.
APPLICATION FILED MAR. 18, 1907.

Witnesses.
Rbt Everett
J. B. Keefer

Inventor.
John Hosking.
By
James L. Norris.
Atty.

UNITED STATES PATENT OFFICE.

JOHN HOSKING, OF CLAREMONT, NEW HAMPSHIRE, ASSIGNOR OF ONE-HALF TO JERE C. DUFRESNE, OF CLAREMONT, NEW HAMPSHIRE.

SAFETY CONNECTION FOR TAPS AND CHUCKS.

No. 881,075.

Specification of Letters Patent.

Patented March 3, 1908.

Application filed March 18, 1907. Serial No. 362,958.

*To all whom it may concern:*

Be it known that I, JOHN HOSKING, a citizen of the United States, residing at Claremont, in the county of Sullivan and State of New Hampshire, have invented new and useful Improvements in Safety Connection for Taps and Chucks, of which the following is a specification.

This invention relates to a tap chuck and particularly to means for separably holding the tap in the socket portion of the chuck.

In ordinary chuck organizations with which taps are used, the tap is rigidly fastened to the driving spindle, and in consequence, when employed for tapping, it becomes necessary, as the tap approaches the bottom of the hole to so regulate the movement of the driving mechanism as to prevent the tap from striking the bottom and receiving the full power transmitted to the spindle or shank, which would result in breaking the tap, or, if the tap is of sufficient strength to resist breakage, would injure the driving mechanism or the material on which the work is being done.

To obviate these difficulties the improved tap chuck is provided with a safety pin to engage the tap shank, said pin being preferably formed of soft steel wire and adapted to be sheared off or broken when the tap reaches the bottom of the hole and thus prevent injury to the tap chuck and the driving mechanism as well as the material operated upon. It is proposed to use safety pins for connecting the taps to the chucks having variations in diameter to correspond to the sizes of the taps. The advantage of the use of a plurality of pins of different diameters will be obvious in view of the fact that more power is required to operate a one-inch tap, for instance, than a tap of smaller dimensions, and if the smaller pin was used with the larger tap it would be without practical service in view of the fact that it would shear or break at an undesirable time or before the tap had completed its work. The invention also contemplates details of construction which will be more fully hereinafter specified.

Figure 1:
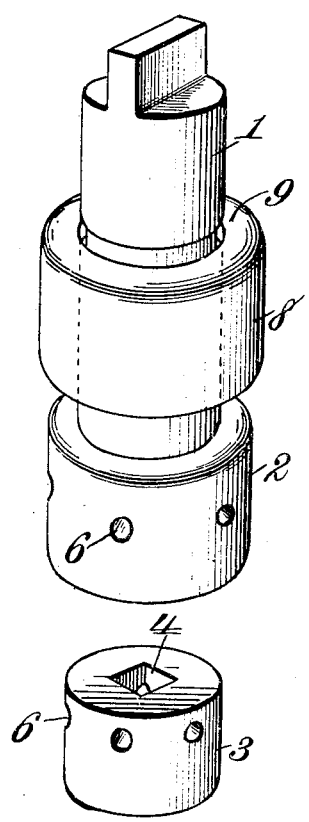
Figure 2:
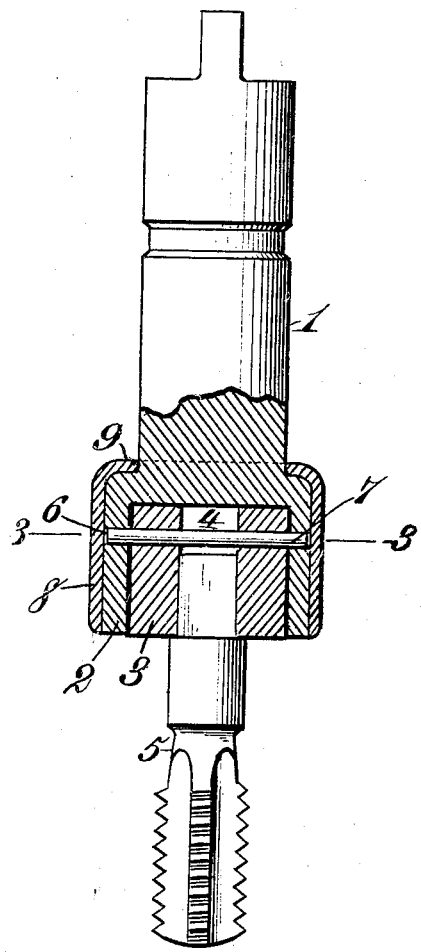
Figure 4:
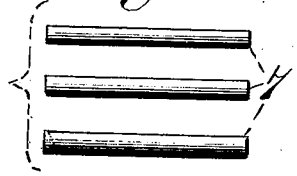
Figure 3:
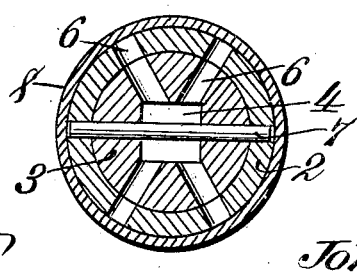

In the drawing: Figure 1 is a perspective view of a tap chuck embodying the features of the invention and showing the parts separated. Fig. 2 is an elevation, partly in section, of a tap chuck showing a tap secured therein by the improved safety pin. Fig. 3 is a horizontal section on the line 3—3, Fig. 2. Fig. 4 shows detail views of safety pins having varying diameters.

Similar characters of reference are employed to indicate corresponding parts in the several views.

The numeral 1 designates the shank or stem of the chuck, to the upper end of which suitable driving means may be applied. At the lower end of the chuck stem or shank is a socket 2 in which is removably fitted a bushing 3, the latter having an angular opening 4 to receive the correspondingly shaped shank of a tap 5. The upper portions of the socket and bushing are formed with a plurality of diametrically arranged openings 6 to receive pins 7, the openings 6 and pins 7 being of different sizes or diameters. The pins 7 serve as safety pins for connecting the bushing carrying the tap to the socket 2 so that the said bushing and tap will rotate with the stem or shank 1 and the socket, and the several pins are made just long enough to terminate at their opposite ends flush with the outer surface of the socket. To permit the pins 7 to be readily inserted through the socket 2 and bushing 3 and also to retain the pins in inseparable relation to the parts just mentioned, a movable collet 8 is provided and is adapted to cover the socket, as clearly shown by Fig. 2. This collet 8 is of a length equal to that of the socket and has an upper inturned flange 9 which snugly embraces the shank or stem 1. The collet is readily movable over the shank or stem 1 as shown by Fig. 1, and fits the parts to which it is applied with sufficient tightness to remain in the position desired over the socket during the operation of the tap.

The safety pins 7 are preferably formed of soft steel wire, and each pin has a resisting strength sufficient to withstand breakage or separation during the operation of the tap and before the latter reaches the bottom or terminal of the hole. As soon, however, as the taps of various sizes held by the pins of relative diameters in the manner disclosed by Fig. 2, reach the bottom of the holes, each pin is sheared or broken and the chuck driving mechanism and work are prevented from being injured. After a pin has become broken it may be readily replaced by uncovering the socket, or drawing the collet over the shank or stem 1 and after a new pin has been inserted through the socket and bushing the collet may be again readjusted in normal position.

The improved safety means will be found exceptionally advantageous and though it has been particularly described as applicable to a tap chuck and tap, it will be understood that it may be used in drills and other boring tools as well as in stud setting implements.

The parts may also be modified in their proportions, dimensions and minor details without departing from the spirit of the invention.

Having thus fully described the invention, what is claimed as new, is:

A tap chuck having a socket, a bushing mounted in the socket, the bushing and socket having diametric openings therethrough, a tap fitted in the bushing, a breakable safety pin inserted in the openings of the bushing and socket, and means movable over the socket for exposing the said openings and also for preventing separation of the pin from the socket and bushing.

In testimony whereof I have hereunto set my hand in presence of two subscribing witnesses.

JOHN HOSKING.

Witnesses:
ROBERT V. HART,
JOHN F. McKENNA.